(12) United States Patent
Grams

(10) Patent No.: US 10,310,710 B2
(45) Date of Patent: Jun. 4, 2019

(54) DETERMINATION OF INDENTATION LEVELS OF A BULLETED LIST

(71) Applicant: KONICA MINOLTA LABORATORY U.S.A., INC., San Mateo, CA (US)

(72) Inventor: Jason Grams, Westminster, CO (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 243 days.

(21) Appl. No.: 15/280,493

(22) Filed: Sep. 29, 2016

(65) Prior Publication Data

US 2018/0088747 A1    Mar. 29, 2018

(51) Int. Cl.
G06K 9/00 (2006.01)
G06F 3/0482 (2013.01)
G06F 17/22 (2006.01)
G06F 17/24 (2006.01)

(52) U.S. Cl.
CPC ........ *G06F 3/0482* (2013.01); *G06F 17/2241* (2013.01); *G06F 17/242* (2013.01); *G06K 9/00442* (2013.01); *G06K 9/00469* (2013.01)

(58) Field of Classification Search
CPC .............................. G06F 3/0482; G06F 17/212
See application file for complete search history.

(56) References Cited

U.S. PATENT DOCUMENTS

| 6,561,613 | B2 | 5/2003 | Cunnagin et al. |
| 6,587,587 | B2 | 7/2003 | Altmann et al. |
| 2005/0063591 | A1* | 3/2005 | Chen ............... G06F 17/242 382/181 |
| 2009/0026265 | A1* | 1/2009 | Grosse ............. B41J 2/15 235/435 |
| 2015/0095022 | A1* | 4/2015 | Xu ............... G06K 9/00456 704/10 |

* cited by examiner

*Primary Examiner* — John B Strege
(74) *Attorney, Agent, or Firm* — Squire Patton Boggs (US) LLP

(57) ABSTRACT

Determination of indentation levels of a bulleted list contained in an input image involves iteratively performing comparison cycles in which the horizontal positions of vertically adjacent pairs of bullets are compared for similarity. If similar in position, the bullets in the pair are aggregated into the same indentation level. Subsequent comparison cycles use bullet positions which were adjusted in a prior comparison cycle to address progressive shifting that may sometimes be present in an input image. Readjustment cycles can be performed to aggregate bullets into the same indentation level, if similar in position, even when the bullets are not vertically adjacent to each other.

27 Claims, 14 Drawing Sheets

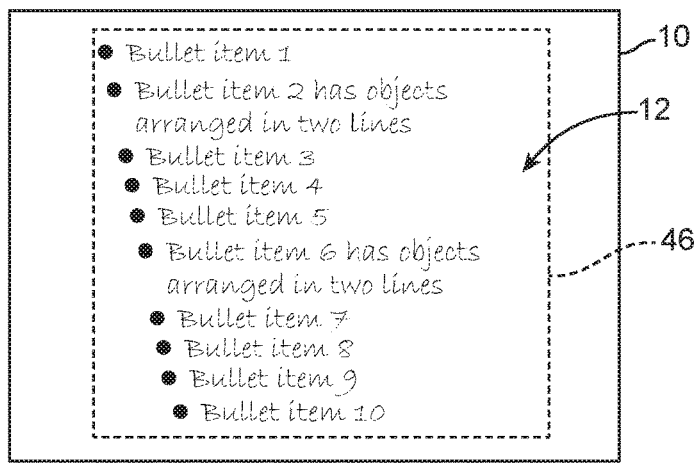
FIG. 8A
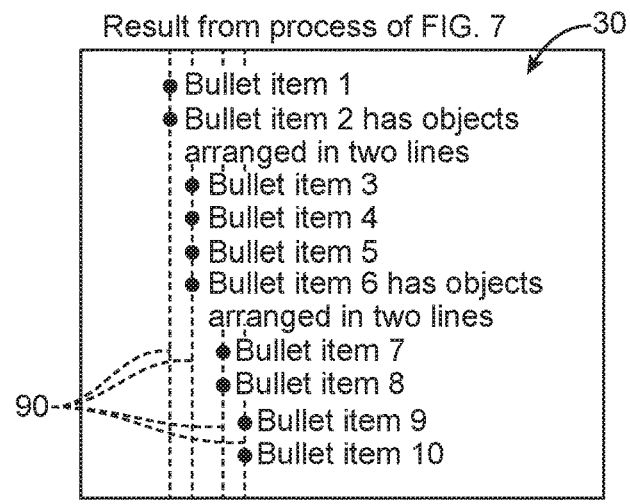
FIG. 8B
FIG. 8C
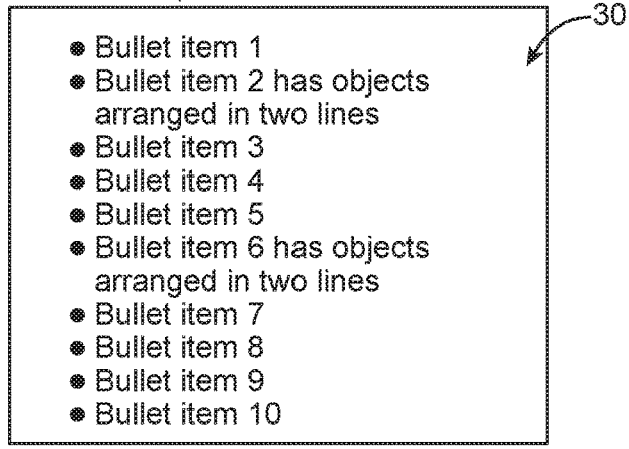
FIG. 8D

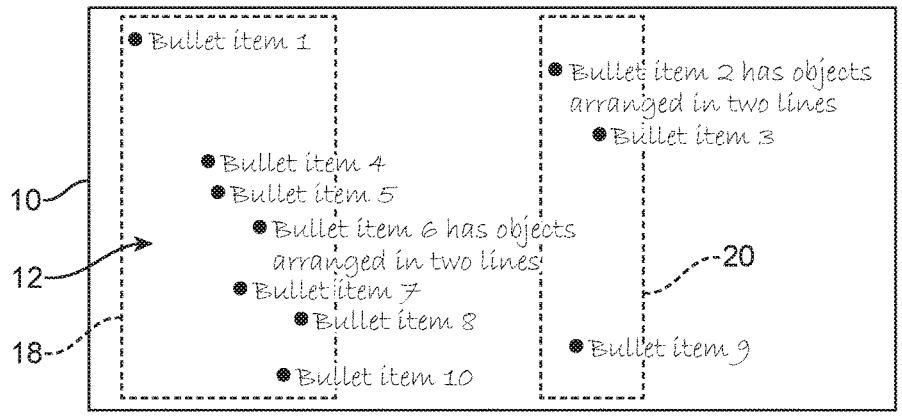
FIG. 9A
| Bullet n | X Fig.9A | X' Fig.9C | X' Fig.9D | X" Fig.9E |
|---|---|---|---|---|
| 1 | 0 | 0 | 0 | 0 |
| 2 | 20 | 20 | 20 | 20 |
| 3 | 22 | 20 | 20 | 20 |
| 4 | 3.5 | 3.5 | 3.5 | 0 |
| 5 | 4 | 3.5 | 3.5 | 0 |
| 6 | 6 | 3.5 | 3.5 | 0 |
| 7 | 5 | 3.5 | 3.5 | 0 |
| 8 | 8 | 8 | 3.5 | 0 |
| 9 | 21 | 21 | 21 | 20 |
| 10 | 7 | 7 | 7 | 0 |
FIG. 9B
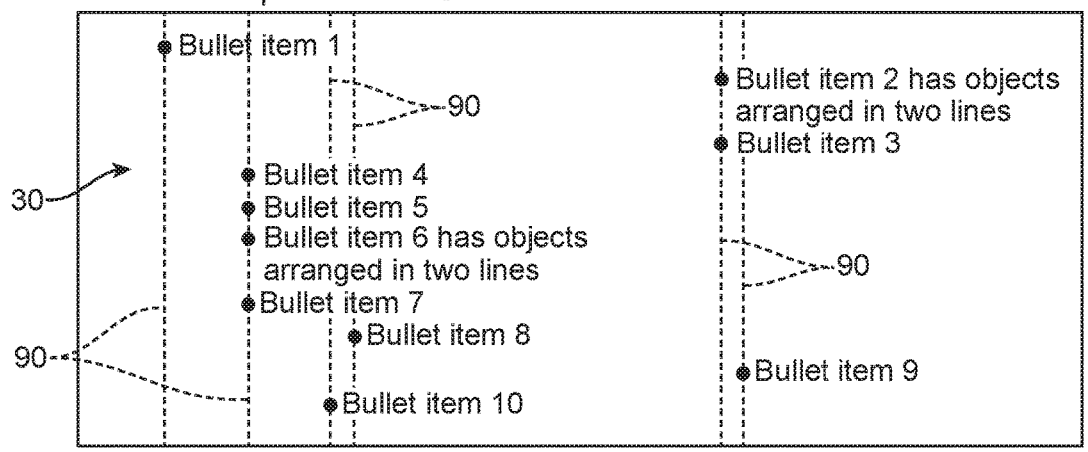
FIG. 9C

| Bullet n | X' |
|---|---|
| 1 | 0 |
| 2 | 20 |
| 3 | 20 |
| 4 | 3.5 |
| 5 | 3.5 |
| 6 | 3.5 |
| 7 | 3.5 |
| 8 | 3.5 |
| 9 | 21 |
| 10 | 7 |

→ sort →

| Bullet m | Bullet n | Sorted X' |
|---|---|---|
| 1 | 1 | 0 |
| 2 | 4 | 3.5 |
| 3 | 5 | 3.5 |
| 4 | 6 | 3.5 |
| 5 | 7 | 3.5 |
| 6 | 8 | 3.5 |
| 7 | 10 | 7 |
| 8 | 2 | 20 |
| 9 | 3 | 20 |
| 10 | 9 | 21 |

→ readjust →

| Bullet n | X'' |
|---|---|
| 1 | 0 |
| 4 | 0 |
| 5 | 0 |
| 6 | 0 |
| 7 | 0 |
| 8 | 0 |
| 10 | 0 |
| 2 | 20 |
| 3 | 20 |
| 9 | 20 |

FIG. 12

COMPARISON CYCLES

| Cycle | Vertically Adjacent Pairs of Bullets n | | Comparison Requirement Satisfied? | Adjustment to Index Position (IP) | Index Position (IP) | Adjustment to Horizontal Position of Next Bullet | Adjusted Position of Bullet |
|---|---|---|---|---|---|---|---|
| | Current Bullet | Next Bullet | | | | | |
| | | | | | | | $X'_1=0$ |
| 1 | 1 | 2 | No | Set IP=$X_2$ | 20 | None | $X'_2=20$ |
| 2 | 2 | 3 | Yes | None | 20 | Set $X'_3=20$ | $X'_3=20$ |
| 3 | 3 | 4 | No | Set IP=$X_3$ | 3.5 | None | $X'_4=3.5$ |
| 4 | 4 | 5 | Yes | None | 3.5 | Set $X'_5=3.5$ | $X'_5=3.5$ |
| 5 | 5 | 6 | Yes | None | 3.5 | Set $X'_6=3.5$ | $X'_6=3.5$ |
| 6 | 6 | 7 | Yes | None | 3.5 | Set $X'_7=3.5$ | $X'_7=3.5$ |
| 7 | 7 | 8 | Yes | None | 3.5 | Set $X'_8=3.5$ | $X'_8=3.5$ |
| 8 | 8 | 9 | No | Set IP=$X_9$ | 21 | None | $X'_9=21$ |
| 9 | 9 | 10 | No | Set IP=$X_{10}$ | 7 | None | $X'_{10}=7$ |

FIG. 13

READJUSTMENT CYCLES

| Cycle | Horizontally Adjacent Pairs of Bullets n | | Re-adjustment Requirement Satisfied? | Adjustment to Offset Position (OP) | Offset Position (OP) | Adjustment to Horizontal Position of Second Bullet | Re-adjusted Position of Bullets |
|---|---|---|---|---|---|---|---|
| | First Bullet | Second Bullet | | | | | |
| | | | | | | | $X''_1=0$ |
| 1 | 1 | 4 | Yes | None | 0 | Set $X''_4=0$ | $X''_4=0$ |
| 2 | 4 | 5 | Yes | None | 0 | Set $X''_5=0$ | $X''_5=0$ |
| 3 | 5 | 6 | Yes | None | 0 | Set $X''_6=0$ | $X''_6=0$ |
| 4 | 6 | 7 | Yes | None | 0 | Set $X''_7=0$ | $X''_7=0$ |
| 5 | 7 | 8 | Yes | None | 0 | Set $X''_8=0$ | $X''_8=0$ |
| 6 | 8 | 10 | Yes | None | 0 | Set $X''_{10}=0$ | $X''_{10}=0$ |
| 7 | 10 | 2 | No | Increase OP | 20 | None | $X''_2=20$ |
| 8 | 2 | 3 | Yes | None | 20 | Set $X''_3=20$ | $X''_3=20$ |
| 9 | 3 | 9 | Yes | None | 20 | Set $X''_9=20$ | $X''_9=20$ |

FIG. 14

DETERMINATION OF INDENTATION LEVELS OF A BULLETED LIST

FIELD

This disclosure relates generally to image processing and, more particularly, to a method, non-transitory computer readable medium, and system for analyzing an image to determine indentations levels of a bulleted list in the image.

BACKGROUND

Electronic documents come in many different forms. For example, an electronic document may be produced by a scanning machine or electronic camera which converts an optical image to a computer readable file format. The optical image can be of a paper document, whiteboard, chalkboard, billboard, or even an electronic display screen. An electronic document may be produced by a tablet having a touch sensitive screen that receives handwritten input from the user's finger or a stylus and is then stored by the tablet in a computer readable file format. Computer readable file formats include PDF (Portable Document Format), JPEG (Joint Photographic Experts Group), GIF (Graphics Interchange Format), TIFF (Tagged Image File Format), PNG (Portable Network Graphics), and other formats that store bitmap images, as well as other formats.

The computer readable file format of an electronic document may be converted to a form that facilitates distribution of the essential content of the original electronic document via email and other electronic means. Conversion may be to a form that facilitates editing, such as in a basic text editor or word processing program. For example, optical character recognition (OCR) could be used as part of the conversion process to produce machine-encoded text which can later be searched and/or manipulated.

As shown in FIG. 1, image 10 of an electronic document may include bulleted list 12. Bulleted list 12 is a list in which one or more objects are introduced or led by a particular typographic symbol, referred to as a bullet. The bullet may take one of various forms, such as an asterisk (*), hyphen (-), plus sign (+), equal sign (=), and others. Other types of bullets include, without limitation, filled and non-filled circles, triangles, squares, and diamonds. In FIG. 1, each bullet 14 is a filled circle. Each item within bulleted list 12 is referred to as bullet item 16. Each bullet item 16 may include one or more item objects, which can be any one or a combination of text, photographs, pictures, and other graphical representations. A bullet item may contain multiple lines of item objects. For example, a bullet item may contain a sequence of words and/or other objects in multiple linear arrangements (lines) that form a paragraph-like structure. In FIG. 1, bulleted list 12 has ten bullet items 16 with each bullet item 16 containing handwritten text arranged in a single line.

Bulleted lists may have a hierarchical structure having multiple levels defined by indentations. In FIG. 1, bulleted list 12 has two indentation levels. Items 1 through 9 were originally intended by the author of the bullleted list to be in the same indentation level, designated as first indentation level 18. Subitem 1 was originally intended to be in the next indentation level designated as second indentation level 20.

Image 10 does not encode the hierarchical structure of bulleted list 12. In particular, image 10 does not encode aggregated indention levels, in that pairs of bullet items 16 having different horizontal positions in image 10 are not identified as being alike in indentation level. Since image 10 does not encode the hierarchical structure, items within bulleted list 12 cannot be easily edited. For example, image 10 may be a bitmap image in which bitmap image data for bullet items 16 are not grouped together according to the hierarchical structure that was originally intended by the bulleted list author and that would be apparent to a person looking at image 10. Conversion of image 10 could be performed if a person (a user) wants to easily delete or add a bullet item, rearrange the order of bullet items, or change the indentation level of a bullet item. However, conversion should accurately encode the hierarchical structure that was originally intended by the author of the bulleted list. Here, "accurately encoding" refers to accurately identifying pairs of bullet items 16 having different horizontal positions in image 10 as being alike in indentation level. If conversion does not accurately encode the hierarchical structure that was originally intended, the user will have to modify the converted bulleted list in order to match what was originally intended.

As shown in FIG. 1, it is possible for many bullet items 16 to be misaligned even when they are all originally intended to be in first indentation level 18. Misalignment occurs when the horizontal position of a bullet differs from that of another bullet within the same indentation level. As shown in FIG. 1, the difference in horizontal position can be progressive such that the horizontal distance from the first (top) bullet increases with each successive bullet within the same indentation level. This phenomenon, referred to as "progressive shifting" herein, frequently occurs when the bulleted list is created on a large surface, such as a whiteboard. Progressive shifting can make it difficult to accurately encode the originally intended hierarchical structure.

SUMMARY

Briefly and in general terms, the present invention is directed to a method, a non-transitory computer readable medium, and a data processing system for determining indentation levels of a bulleted list.

In aspects of the invention, a method for determining indentation levels of a bulleted list in an image, where the bulleted list has a plurality of bullets that are vertically arranged and each bullet has a horizontal position, comprises performing a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle, wherein the performance of each of the comparison cycles includes: obtaining an index position if the comparison cycle is the first comparison cycle; determining whether or not a difference between the horizontal position of the current bullet and the horizontal position of the next bullet satisfies a comparison requirement to identify the current bullet and the next bullet as being alike in indentation level; adjusting the horizontal position of the next bullet according to the index position when the comparison requirement is satisfied; and adjusting the index position when the comparison requirement is not satisfied.

In aspects of the invention, a non-transitory computer readable medium has stored thereon computer readable instructions that, when executed by a hardware processor, cause a data processing system to perform a method for determining indentation levels of a bulleted list in an image, where the bulleted list has a plurality of bullets that are vertically arranged and each bullet has a horizontal position. The method performed by the data processing system comprises performing a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle, wherein the performance of each of the comparison cycles includes: obtaining an index position if the comparison cycle is the first comparison cycle; determining whether or not a difference between the horizontal position of the current bullet and the horizontal position of the next bullet satisfies a comparison requirement to identify the current bullet and the next bullet as being alike in indentation level; adjusting the horizontal position of the next bullet according to the index position when the comparison requirement is satisfied; and adjusting the index position when the comparison requirement is not satisfied.

In aspects of the invention, a data processing system for determining indentation levels of a bulleted list in an image, where the bulleted list has a plurality of bullets that are vertically arranged and each bullet has a horizontal position, comprises a hardware processor, and one or more memory devices associated with the hardware processor, wherein the hardware processor is configured to determine indentation levels by performing a method that comprises performing a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle, wherein the performance of each of the comparison cycles includes: obtaining an index position if the comparison cycle is the first comparison cycle; determining whether or not a difference between the horizontal position of the current bullet and the horizontal position of the next bullet satisfies a comparison requirement to identify the current bullet and the next bullet as being alike in indentation level; adjusting the horizontal position of the next bullet according to the index position when the comparison requirement is satisfied; and adjusting the index position when the comparison requirement is not satisfied.

The features and advantages of the invention will be more readily understood from the following detailed description which should be read in conjunction with the accompanying drawings.

BRIEF DESCRIPTION OF THE DRAWINGS

FIG. 8A shows an image containing an exemplary bulleted list originally intended to have a single indentation level.

FIG. 8B shows a table containing exemplary horizontal positions for bullets in the bulleted list of FIG. 8A.

FIG. 8C shows an exemplary list object that does not accurately encode the originally intended hierarchical structure of the bulleted list of FIG. 8A.

FIG. 8D shows an exemplary list object that accurately encodes the originally intended hierarchical structure of the bulleted list of FIG. 8A.

FIG. 9A shows an image containing an exemplary bulleted list having two indentation levels.

FIG. 9B shows a table containing exemplary horizontal positions for bullets in the bulleted list of FIG. 9A.

FIGS. 9C and 9D show exemplary list objects that do not accurately encode the originally intended hierarchical structure of the bulleted list of FIG. 9A.

FIG. 12 shows a table containing exemplary horizontal positions subjected to the secondary process of FIG. 11.

FIG. 13 shows a table of comparison cycles of FIG. 10 applied to horizontal positions of the bullets of FIG. 9A.

FIG. 14 shows a table of readjustment cycles of FIG. 11 applied to horizontal positions after the comparison cycles of FIG. 13.

DETAILED DESCRIPTION

Figures 2A, 2B:
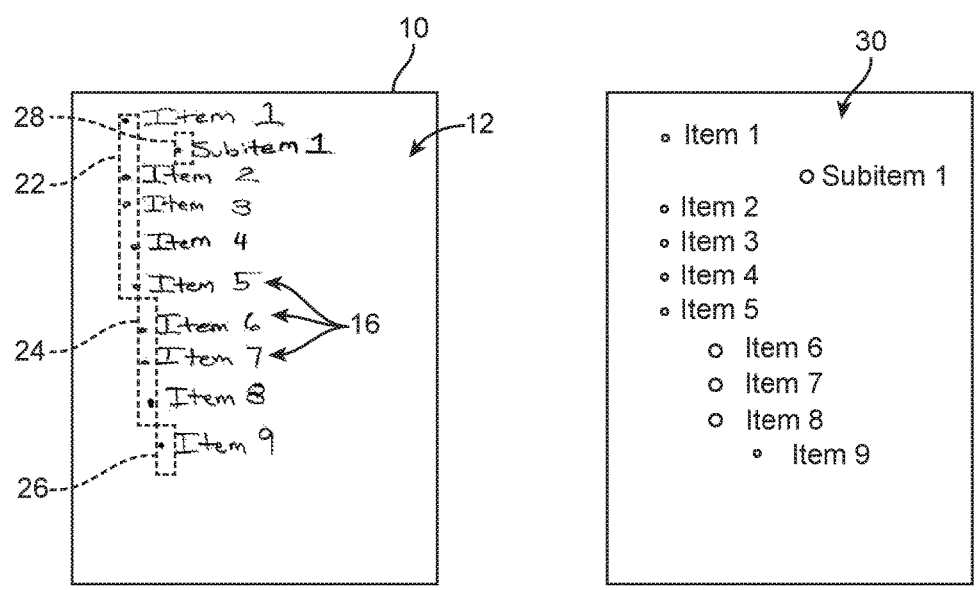
FIG. 2A shows the image of FIG. 1 with an inaccurate interpretation of the intended hierarchical structure.
FIG. 2B shows an exemplary list object corresponding to FIG. 2A.

Referring now in more detail to the exemplary drawings for purposes of illustrating aspects of the invention, wherein like reference numerals designate corresponding or like elements among the several views, there is shown in FIG. 2A an exemplary approach for converting image 10 of bulleted list 12 which causes bullet items 16 to be grouped into indentation levels 22, 24, 26, 28.

The conversion process produces list object 30 shown in FIG. 2B. As used herein, a "list object" is an electronic document having any format that encodes a hierarchical structure of bulleted list 12. Examples of formats include, without limitation, those used in RTF (rich text format) files or other word processing files. The format could include various tags that identify indentation levels, bullet items within each indentation level, and objects within each bullet item.

Figure 3:
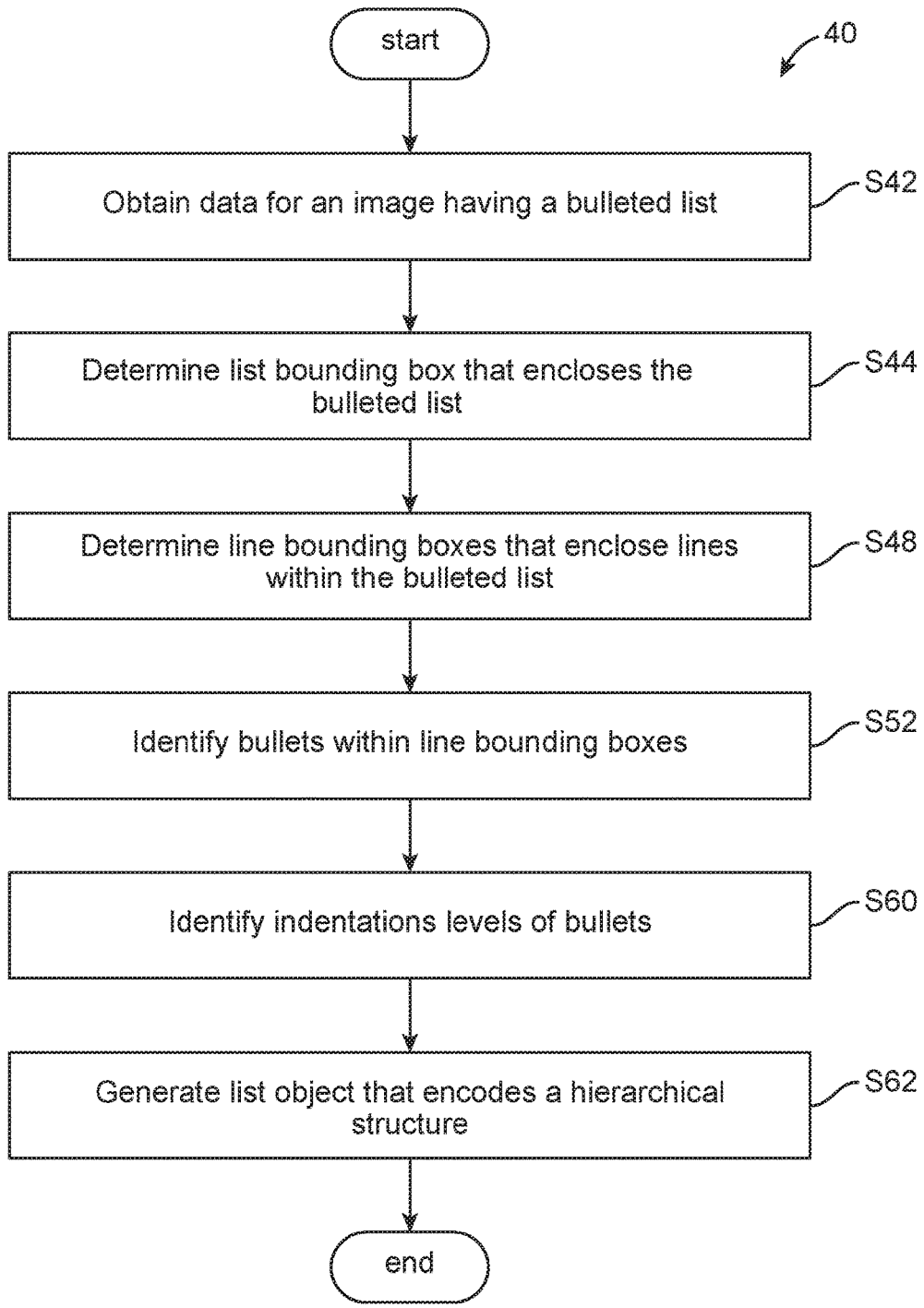
FIG. 3 is a flow diagram showing an exemplary process for generating a list object that encodes a hierarchical structure for a bulleted list.

FIG. 3 shows exemplary conversion process 40 that can be embodied, in whole or in part, in a bullet recognition software module or algorithm. Conversion process 40 includes a series of process blocks, any or all of which may be performed prior to or after an optical character recognition (OCR) process. Performing conversion process 40 prior to an OCR process allows list object 30 to include non-text objects and/or unrecognizable text. Unrecognizable text may be included, in the form of a raw bitmap for example, as one of the item objects in list object 30. Another potential advantage in performing conversion process 40 prior to an OCR process is that boxed regions of the image believed to contain text will already be known when starting the OCR process, which may aid the OCR process by allowing marks outside the previously identified boxed regions to be considered extraneous and thus ignored by the OCR process.

Figure 4:
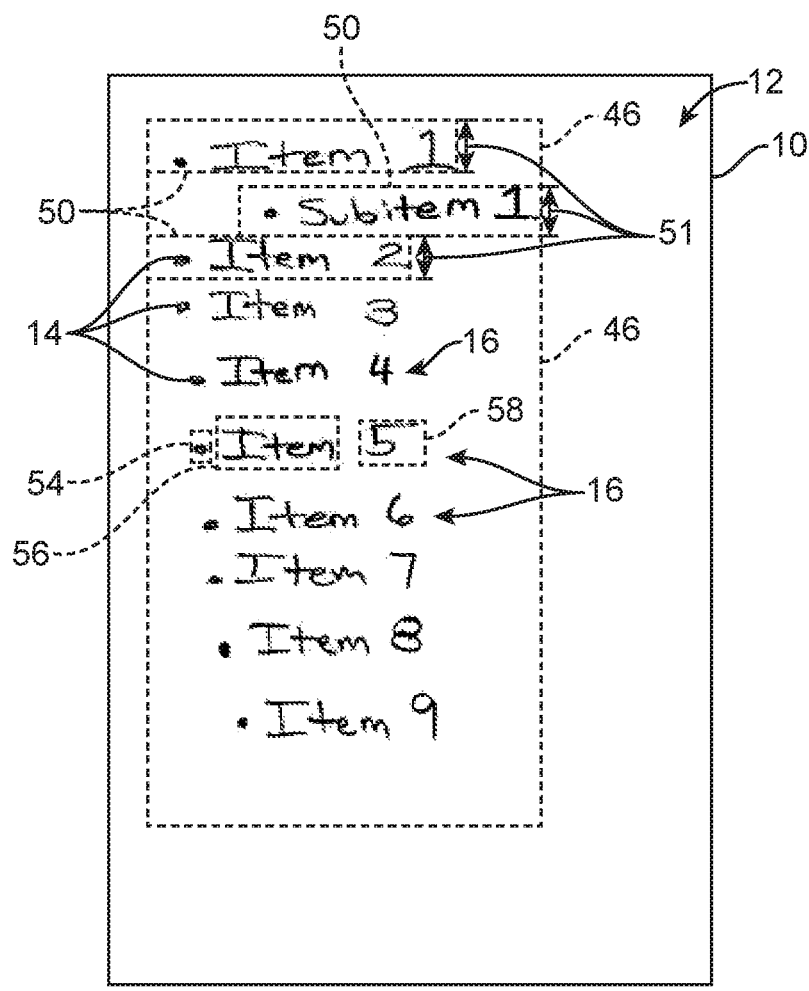
FIG. 4 shows exemplary bounding boxes applied to elements of the bulleted list during the process of FIG. 3.

Data for image 10 (such as electronic document containing bitmap data) is obtained at block S42, and then the overall appearance of image 10 is analyzed at block S44 to determine list bounding box 46 enclosing bulleted list 12, as shown in FIG. 4. The term "bounding box" as used herein refers to a boxed region having a rectangular perimeter enclosing an object of interest. Here, list bounding box 46 has a rectangular perimeter enclosing bulleted list 12. As mentioned above, conversion process 40 is optionally performed prior to an OCR process, in which case the analyses of image 10 at block S44 and subsequent blocks in FIG. 3 do not make use of data resulting from an OCR process.

Referring again to FIG. 3, image 10 is analyzed at block S48 to determine multiple line bounding boxes 50 (FIG. 4) enclosing lines within bulleted list 12. Here, the term "line" refers to a linear arrangement of bullet list item objects, which can be any one or a combination of text, photographs, pictures, and other graphical representations. Line bounding boxes are illustrated only for Item 1, Subitem 2, and Item 2, although it is to be understood that line bounding boxes are determined for Items 3-9 as well.

Image 10 is analyzed at block S52 to identify bullets. Specifically, image 10 is analyzed to determine intra-line bounding boxes 54, 56, 58 (FIG. 4) for objects within each line bounding box 50. Intra-line bounding boxes are illustrated only for Item 5, although it is to be understood that intra-line bounding boxes are also determined for Items 1-4, Subitem 1, and Items 6-9. An intra-line bounding box is determined for every bullet 14 and item objects that follow the bullets. The line bounding box for Item 5 is not illustrated so as to clearly show intra-line bounding box 54, 56, 58, and it is to be understood that intra-line bounding boxes are determined within the line bounding boxes for all ten bullet items 16. Starting intra-line bounding box 54 is designated as a bullet by analyzing dimensions of starting intra-line bounding box 54. For example, the dimensions of starting intra-line bounding box 54 may be compared to dimensions of other intra-line bounding boxes 56, 58. A smaller height-to-width ratio of intra-line bounding box 54 relative to that of intra-line bounding boxes 56, 58 may be used as factor in designating intra-line bounding box 54 as a bullet.

Referring again to FIG. 3, image 10 is analyzed at block S60 to identify indentation levels of bullets identified at block S52. Specifically, image 10 is analyzed to identify bullets 14 that have similar horizontal positions, and to aggregate bullets that are alike in indentation level based on similarity of their horizontal positions. The horizontal positions of bullets 14 can be the horizontal positions of the left edges or geometric centers of starting intra-line bounding boxes which have been designated as bullets.

In an exemplary method for comparing horizontal positions of bullets 14, image 10 may be divided into vertical columns having predetermined widths that may correspond to a threshold T in FIG. 7 discussed later. Bullets 14 that fall within the same column are determined to be similar to each other and are encoded in the same indentation level. This could be accomplished by using the horizontal position of the first bullet in the indentation level as the reference against which the horizontal positions of subsequent bullets are compared. With reference to FIG. 2B, a possible result of using such a method is that Items 1-5 are encoded in one indentation level, and Items 6-8 are encoded in another indentation level. Also, Subitem 1 and Item 9 are encoded in other indentation levels. Thus, this method of comparing bullet horizontal positions may not always be accurate when progressive shifting is present in an image of a bulleted list.

The analysis of image 10 may involve image processing techniques, such as iterative dilate and erode (DE) operations. The DE operation takes an image of an object (for example, a bulleted list, a line within the bulleted list, or an object within the line) in image 10, and then applies a structuring element to the image to create a morphologically transformed image of the same size. The value of each pixel in the transformed image is based on a comparison of a corresponding pixel in the original image with its neighboring pixels. The erode portion of a DE operation erodes edges or removes pixels at the edges of an object in the image. The dilate portion of a DE operation does the opposite by enlarging edges or adding pixels to edges of the object. The determination of any of the bounding boxes discussed above includes determining the location and size of the bounding box by use of one or more erode operations followed by one or more dilate operations (or vice versa) to generate a morphologically transformed image from which contours are identified, followed by identification of a boxed region in which a cardinality of contours exceeds a contour threshold.

Still referring to FIG. 3, a list object is generated at block S62 based on analysis of image 10 in the preceding blocks. Referring to FIG. 2A, the horizontal positions of the bullets are compared in such a way (for example, using the process of FIG. 7 to be discussed later) so that list object 30 of FIG. 2B does not accurately encode the hierarchical structure that was originally intended by the bulleted list author. Items 6-9 were originally intended to be at the same indentation level as Items 1-5, but the conversion process places Items 6-9 at other indentation levels. Another method for comparing horizontal positions of the bullets could be performed (for example, using the process of FIG. 10 and optionally combined with that of FIG. 11 to be discussed later) so that a list object accurately encodes the hierarchical structure that was originally intended.

Figure 5:
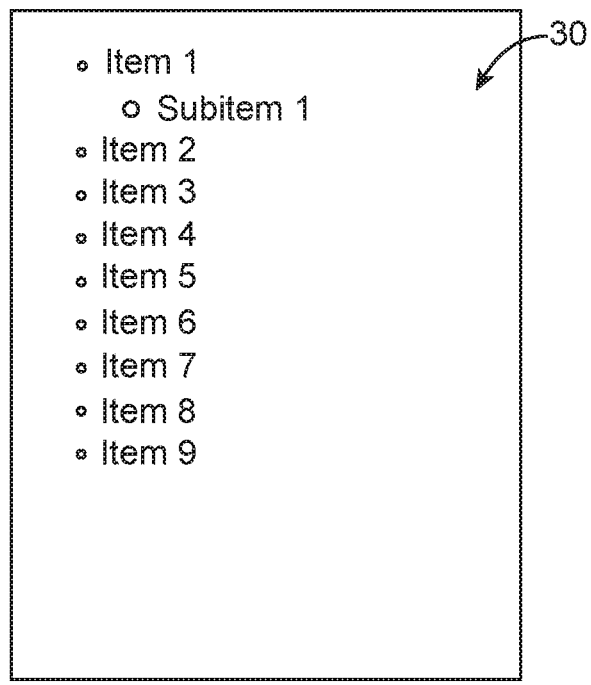
FIG. 5 shows an exemplary list object that accurately encodes the originally intended hierarchical structure in FIG. 1.

FIG. 5 shows exemplary list object 30 that accurately encodes the hierarchical structure originally intended by the bulleted list author. In this case, list object 30 encodes Items 1-9 in the same indentation level and encodes Subitem 1 in another indentation level.

The processes described above and in the examples below may be performed by a data processing system configured to process an image defined in an electronic document. The image may contain one or a combination of photographs, pictures, illustrations, alphanumeric and linguistic characters, symbols, and other graphical representations. The data processing system can be a server, computer workstation, personal computer, laptop computer, tablet, smartphone, facsimile machine, printing machine, multi-functional peripheral (MFP) device that has the functions of a printer and scanner combined, or other type of machine that includes one or more computer processors and memory. The data processing system can be embodied in one machine or multiple machines in communication with each other across a network, such as one or a combination of a local area network (LAN), wide area network (WAN), the Internet, and telephone communication carriers. A single machine may perform the conversion process described herein. Alternatively, multiple machines may perform different portions of the conversion process. For example, one or more machines may perform certain process blocks in FIG. 3, and another one or more machines may perform other process blocks in FIG. 3. One or more machines may perform the process of FIGS. 7 and 10, and another one or more machines may perform the process of FIG. 11. The machines are collectively referred to as a data processing system.

Figure 1:
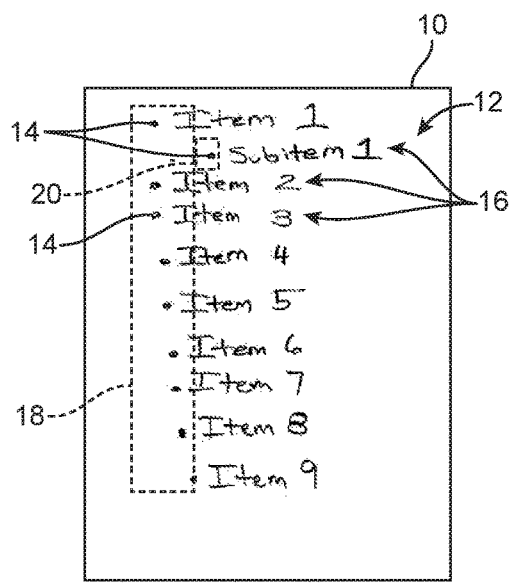
FIG. 1 shows an image containing an exemplary bulleted list and its originally intended hierarchical structure.
Figure 6:
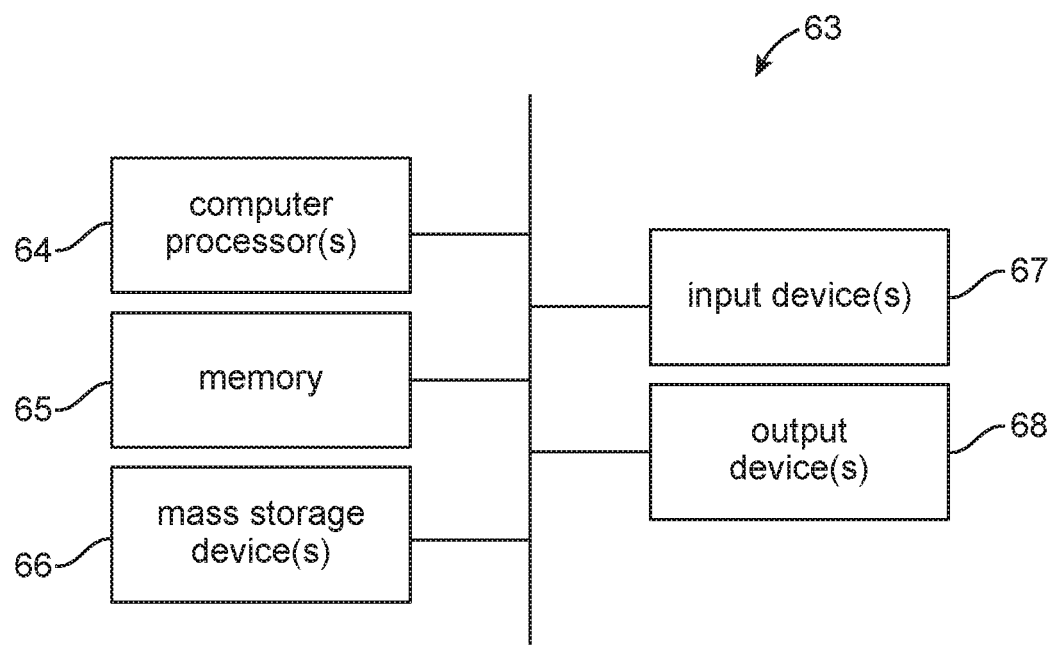
FIG. 6 shows a schematic block diagram of an exemplary data processing system capable of performing the process of FIG. 3.

FIG. 6 shows exemplary data processing system 63 configured to process an image of an electronic document. Data processing system 63 is configured to convert an image (for example, image 10 of FIGS. 1, 8A, and 9A), which contains a bulleted list but does not encode the hierarchical structure of the bulleted list, to a list object that encodes the same or similar hierarchical structure originally intended by the bulleted list author. Data processing system 63 includes one or more computer processors 64, associated memory 65, one or more mass storage devices 66, one or more input devices 67, and one or more output devices 68.

Computer processor(s) 64 may include integrated circuits configured to execute instructions. Hereinafter, the term "hardware processor" will be used to refer to one or more processors. The instructions executed by hardware processor 64 may be embodied in one or more software modules for performing any one or a combination of the processes described herein.

Memory 65 includes any one or a combination of random-access memory (RAM) modules, read-only memory (ROM) modules, and other electronic devices. Mass storage device(s) 66 include any one or a combination of optical drives, magnetic drives, solid-state flash drives, and other data storage devices. Any of memory 65 and mass storage device(s) 66 may embody a non-transitory computer readable medium that stores instructions which when executed cause hardware processor 64 to perform any one or a combination of the processes described herein.

Input device(s) 67 can allow the user to enter data and interact with data processing system 63. Input device(s) 67 can be one or a combination of a keyboard with buttons, touch-sensitive screen, mouse, electronic pen, or other device. Input device(s) 67 are configured to receive a user input, such as a setting for threshold T discussed below.

Output device(s) 68 can be a liquid crystal display, projector, or other type of visual display device. Output device(s) 68 may be used to display image 10 and/or list object 30.

Figure 7:
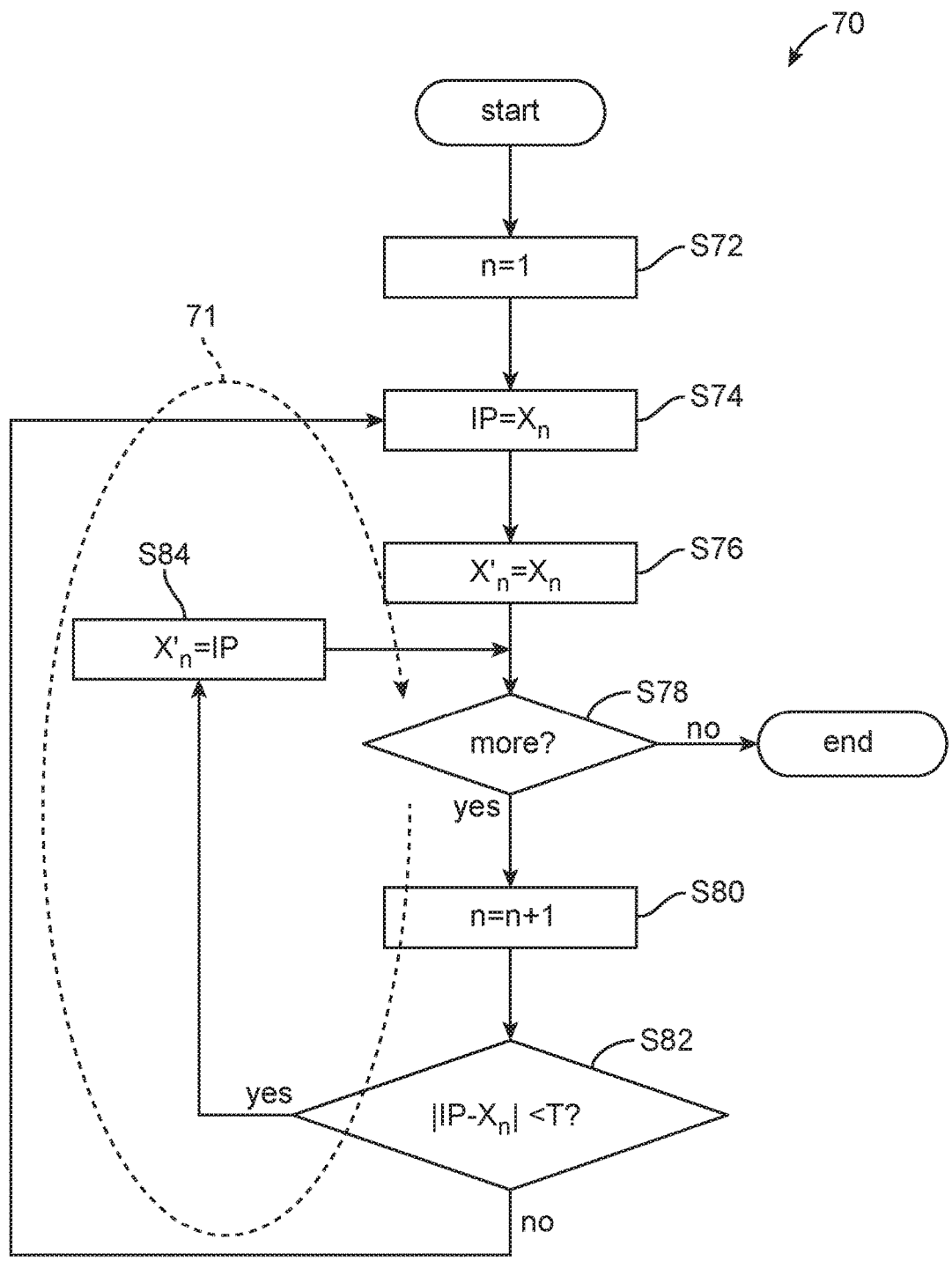
FIG. 7 is a flow diagram showing an exemplary horizontal position comparison process that may be performed as part of the process of FIG. 3.

FIG. 7 shows exemplary horizontal position comparison process 70 that may be performed at block S60 of FIG. 3. Process 70 may be performed by data processing system 40 or another data processing system. Original horizontal positions are derived from image 10 for bullets numbered from n=1 to N, where N can be any integer greater than 1. Numbering corresponds to the order in which the bullets appear, from top to bottom, in image 10.

The original horizontal position of the bullets may correspond to that of a leading edge or geometric center of starting intra-line bounding box 54 (FIG. 4). The original horizontal positions are designated by the letter X with a subscript n identifying a particular bullet. Process 70 includes exemplary comparison cycle 71 that is repeated until an adjusted horizontal position X' is determined for all bullets. The adjusted horizontal positions X' may be used to generate list object 30, such as at block S62 of FIG. 3. As will be discussed below, process 70 determines which bullets have original horizontal positions X that are similar enough to conclude that the bullets should belong in the same indentation level. Similarity is determined by comparing the original horizontal position X to an Index Position (IP) corresponding to the original horizontal position of the first bullet of an indentation level.

Process 70 may begin by obtaining the original horizontal position X of bullet n=1 at block S72. Next at block S74, IP is set equal to the original horizontal position X of the current bullet (for example, the first bullet if n=1). At block S76, the updated horizontal position X' for the current bullet is set equal to its original horizontal position X. At block S78, it is determined whether there are any additional bullets in bulleted list 12. If no (S78: NO), process 70 could end, and conversion optionally proceeds to another process. If yes (S78: YES), the original horizontal position of the next bullet is obtained at block S80. Next at block S82, it is determined whether the absolute value of the difference (referred to herein as "absolute difference") between IP and the original horizontal position X of the next bullet is less than a threshold T. Note that IP represents the horizontal position of the first bullet in the indentation level because IP will not be revised until threshold T is reached at block S82. Thus, it is to be understood that at block S82 a comparison is being made between the original horizontal positions of the first bullet in the indentation level and the next bullet.

The value for threshold T can be determined in various ways. For example, image 10 may have a bitmap (referred to as the input bitmap for process 70) having unknown resolution, so T may be calculated using a consistent pixel dimension. The average line height of all detected lines (for example, the average of all line heights 51 of line bounding boxes 50 in FIG. 4) may be used. Although it may appear counterintuitive, the line heights can be more consistent with each other than character widths. Character width may appear to be a better choice for determining T since character width and horizontal distance are in the same direction, but character width can be very inconsistent. For example, the letter I is much thinner than the letter M. In typical writing, the ratio of character height to overall character width of an entire set of characters can be relatively consistent, so it is believed that a determination of T based upon line height will relate well to the overall character width of an entire set of characters.

For example, threshold T can be determined from the equation:

$$T = F \times (\text{average line height of all detected lines}) \quad \text{(Equation 1)}$$

where factor F can be less than, equal to, or greater than 1. Factor F can be two thirds, one half, one third, or other fraction. Factor F can be obtained from user input as part of conversion process 40 of FIG. 3.

Threshold T need not be fixed or stay the same during evaluation of every bullet, and line height can be used in other ways to determine T. For example, Equation 1 may be modified by replacing "(average line height of all detected lines)" with "(average line height of all lines above the current bullet)." Thus, threshold T may vary depending on the bullet currently being evaluated for similarity. Also, Equation 1 may be modified by replacing "(average line height of all detected lines)" with "(average line height of the L lines nearest to the current bullet)," where L can be any integer greater than 2. Also, the average may be a weighted average with greater weight being placed on the lines nearest to the current bullet. Also, Equation 1 may be modified by replacing "(average line height of all detected lines)" with "(line height of bullet Z)," where bullet Z represents the current bullet, the preceding bullet, or other bullet.

At block S82, reaching threshold T or not being less than T (S82: NO) means that the next bullet is not considered to be in the same indentation level. Thus, returning to block S74, the original horizontal position of the next bullet is stored as IP, and then at block S76, the adjusted horizontal position X' of the next bullet is set equal to its original horizontal position X.

If instead the absolute difference between IP and the original horizontal position X of next bullet does not reach or is below threshold T (S82: YES), then the next bullet is considered to be in the same indentation level, and its adjusted horizontal position X' is set equal to that of the first bullet of the indentation level. This operation occurs at block S84.

The above-described comparison cycle 71 is repeated if, as determined at block S78, there is another bullet to be evaluated. When comparison cycle 71 is repeated, the next bullet becomes the current bullet in the next comparison cycle.

FIG. 8A shows exemplary bulleted list 12. There are a total of ten bullets, all of which are originally intended by the bulleted list author to be in a single indentation level. Bulleted list 12 exhibits progressive shifting from the first (top-most) bullet. Thus, when horizontal position comparison process 70 of FIG. 7 is applied, the resulting list object may have more than one indentation level depending on the original horizontal positions X and the value used for threshold T.

The original horizontal positions X could be as shown in the table of FIG. 8B, for example. The unit of measure for the horizontal positions is arbitrary in this example, and numerical values are provided here to illustrate the relationship between original horizontal positions X and adjusted horizontal positions X'. For example, the unit of measure can be a fraction (for example, $1/100$ or $1/90$) of the width or height of list bounding box 46. The values for X may represent the distance from the left edge of list bounding box 46. When threshold T is set to 4 units, horizontal position comparison process 70 of FIG. 7 provides adjusted horizontal positions X' shown in the right column of the table and reflected in list object 30 of FIG. 8C. FIG. 8C shows that with the threshold held constant at T=4, process 70 did not accurately encode the originally intended indentation level. Four indentation levels 90 are encoded although only one was originally intended by the bulleted list author. As will be discussed below, another horizontal position comparison process can be performed to provide list object 30 of FIG. 8D, which accurately encodes the originally intended indentation level.

FIG. 9A shows exemplary bulleted list 12 which is a modification of an actual case to emphasize progressive shifting in the horizontal position. The example of FIG. 9A is more complex than that of FIG. 8A. In FIG. 9A, the bullets are intended to be in two different indentation levels 18, 20. Also, some bullets in one indentation level are separated from each other by bullets in another indentation level. For instance, bullets 1 and 4 in first indentation level 18 are separated from each other by bullets 2 and 3 in second indentation level 20. With progressive shifting, process 70 of FIG. 7 may result in a list object which does not accurately encode the hierarchical structure that was originally intended.

Figure 9D:
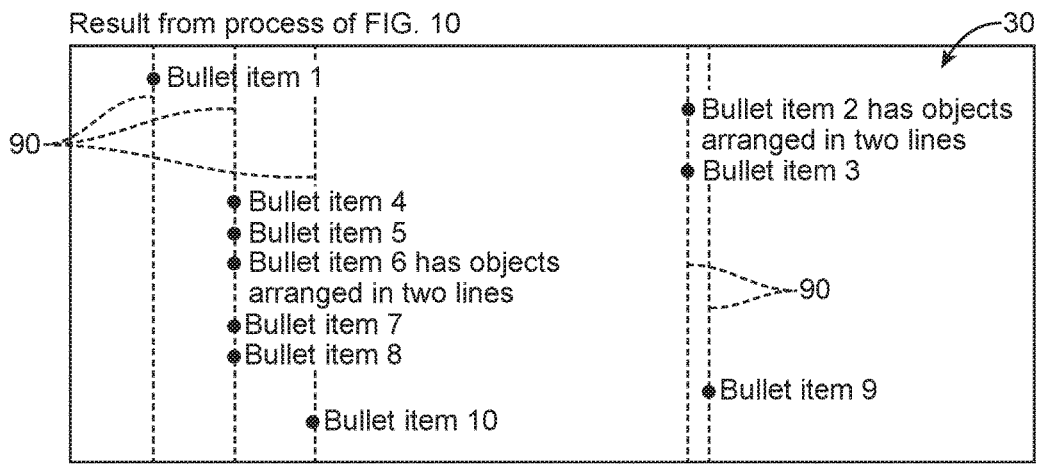
Figure 9E:
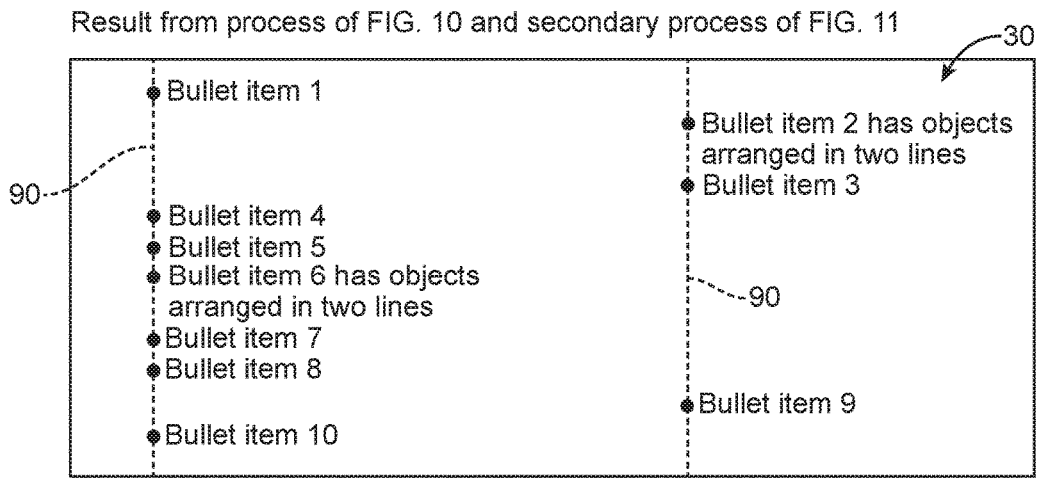
FIG. 9E shows an exemplary list object that accurately encodes the originally intended hierarchical structure of the bulleted list of FIG. 9A.

The original horizontal positions X could be as shown in the table of FIG. 9B, for example. With the threshold held constant at T=4, horizontal position comparison process 70 of FIG. 7 provides adjusted horizontal positions X' shown in the table and reflected in list object 30 of FIG. 9C. With the threshold held constant at T=4, the originally intended indentation levels were not accurately encoded. As shown in FIG. 9C, six indentation levels 90 were encoded when only two were originally intended. Also, because bullets 1 and 4 were separated from each other by bullets in a different indentation level, bullets 1 and 4 were encoded at different indentation levels although they were originally intended to be in the same indentation level. Processing may be modified to improve results. FIGS. 9D-9E show the results of modified processes discussed below.

Figure 10:
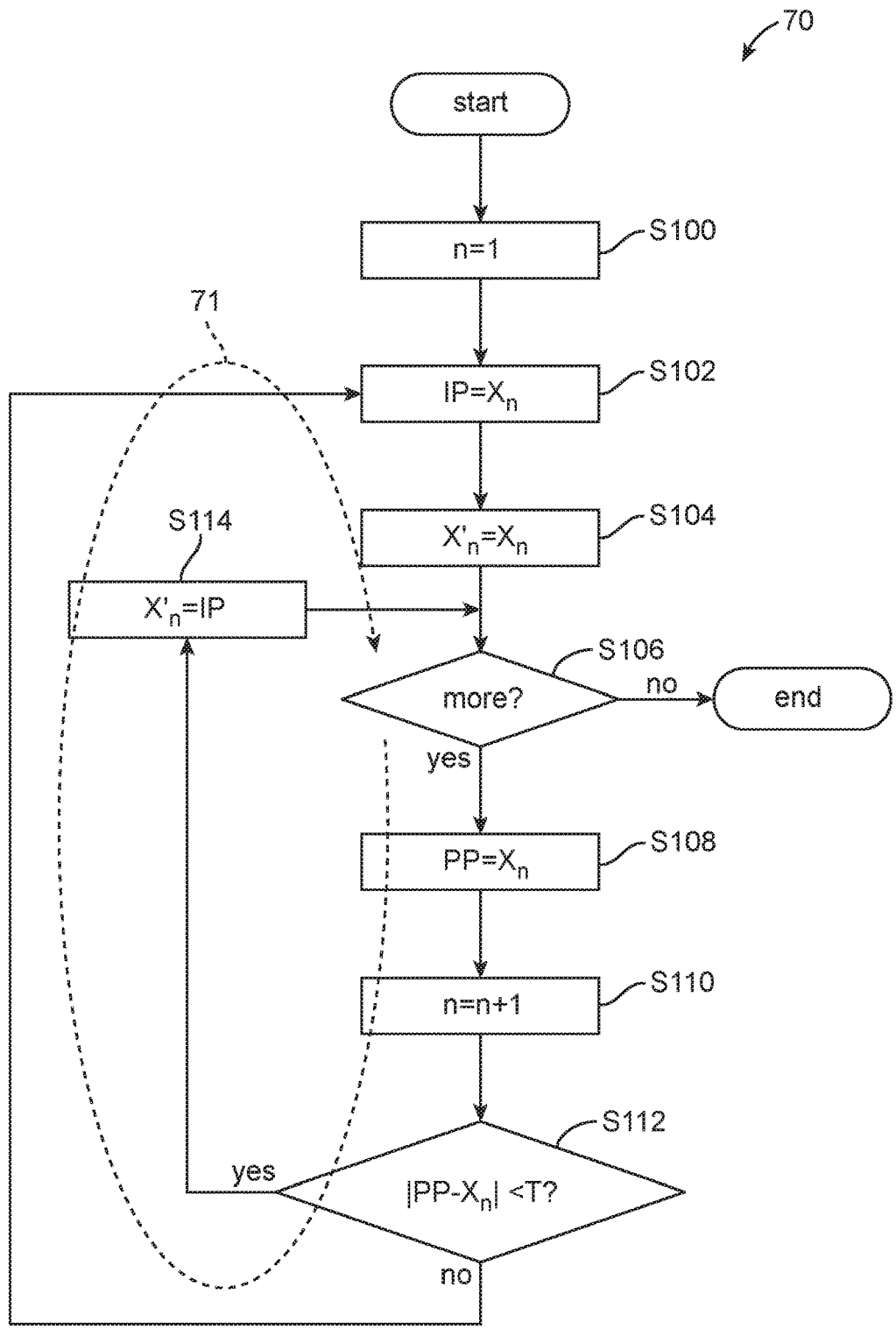
FIG. 10 is flow diagram showing an exemplary horizontal position comparison process that may be performed as part of the process of FIG. 3.

FIG. 10 shows exemplary horizontal position comparison process 70 which is a modification of the one shown in FIG. 7. Each of processes 70 of FIGS. 7 and 10 illustrates exemplary comparison cycles 71 which is repeated until an adjusted horizontal position X' is determined for all bullets.

In FIG. 10, the determination of whether vertically adjacent pairs of bullets are alike in indentation level is performed by comparing the original horizontal position X of a bullet to a Previous Position (PP) which stores the original horizontal position of the immediately preceding bullet. This is in contrast to the process of FIG. 7 in which the original horizontal position X of a bullet is compared to an Index Position (IP) storing the original horizontal position of the first bullet of an indentation level. The first bullet of an indentation level could be distant from the bullet under evaluation. By referencing PP instead of IP, progressive shifting is taken into account so that distant bullets, such as bullets 4 and 8 in FIG. 9A, may be encoded in the same indentation level as originally intended by the bulleted list author.

Process 70 of FIG. 10 may be summarized as follows. If the absolute difference in the original horizontal positions X of two horizontally adjacent bullets (current and next bullets) falls below a threshold T, then the adjusted horizontal position X' of the next bullet is replaced by the adjusted horizontal position of the current bullet. If the absolute difference reaches threshold T, then the horizontal position of the next bullet is not adjusted, so its adjusted horizontal position X' can be set equal to its original horizontal position X.

Process 70 may begin by obtaining the original horizontal position X of bullet n=1 at block S100. At block S102, the Index Position (IP) is set equal to the original horizontal position X of the current bullet (for example, the first bullet if n=1). At block S104, the updated horizontal position X' for the current bullet is set equal to its original position X. At block S106, it is determined whether there is any additional bullet in the bulleted list. If no (S106: NO), process 70 could end, and conversion optionally proceeds to another process. If yes (S106: YES), the Previous Position (PP) is set equal to the original horizontal position X of the current bullet at block S108. At block S110, the original horizontal position of the next bullet is obtained. At block S112, it is determined whether the absolute difference between PP and the original horizontal position X of the next bullet is less than a threshold T. The previous description for threshold T applies here as well.

At block S112, reaching threshold T or not being less than T (S112: NO) means that the next bullet is not considered to be in the same indentation level as the bullet that immediately precedes it. Thus, returning to block S102, the Index Position (IP) is adjusted by setting it equal to the original horizontal position X of the next bullet, and at block S104, the adjusted horizontal position X' of the next bullet is set equal to its original horizontal position X. In effect, the next bullet is not aggregated with any prior bullet.

If instead the absolute difference between the Previous Position (PP) and the original horizontal position X of the next bullet has not reached or is below threshold T (S112: YES), then the next bullet is considered to be in the same indentation level as the bullet that immediately precedes it, so its adjusted horizontal position X' is set equal to IP. This operation occurs at block S114. Recall that IP stores the adjusted horizontal position X' of the first bullet in the indentation level.

The above-described comparison cycle 71 is repeated if, as determined at block S78, there is another bullet to be evaluated. Comparison cycle 71 was performed on a pair of bullets that are vertically adjacent to each other in image 10. The pair of bullets in the above-description were referred as the current bullet and the next bullet. When comparison cycle 71 is repeated, the next bullet discussed above becomes the current bullet in the next comparison cycle.

Block S112 represents a determination of whether a difference between the horizontal position of the current bullet represented by PP ($X_3$ for example) and the horizontal position of the next bullet ($X_4$ for example) satisfies a comparison requirement to identify the current bullet and the next bullet as being alike in indentation level. The comparison requirement is based on threshold T. In this example, the comparison requirement is that the absolute value of the difference must be less than threshold T.

Not reaching threshold T or being less than T (S112: YES) corresponds to satisfying the comparison requirement. In such a case, the horizontal position of the next bullet is adjusted according to the Index Position (IP). For example, at block S114, the horizontal position of the next bullet is adjusted by setting it equal to IP.

Reaching threshold T or not being less than T (S112: NO) corresponds to not satisfying the comparison requirement. In such a case, the Index Position (IP) is adjusted. At block S102, IP is adjusted by setting it equal to the horizontal position X of the next bullet. The horizontal position of the next bullet could be used in other ways to adjust IP. For example, IP could be set equal to value determined by an equation containing the horizontal position of the next bullet.

The comparison requirement used at block S122 uses the condition "less than." A different comparison requirement could be used. For example, the condition "less than" could be replaced with "less than or equal to" and possibly have the same result. The same result could be achieved, for example, by requiring the absolute value of the difference to be less than or equal to a slightly lower value for threshold T. As previously discussed, threshold T can be determined from Equation 1 or other equation which makes use of one or more line heights.

In FIGS. 7 and 10, the adjusted horizontal position X' of the next bullet is set equal to the Index Position (IP) only if the next bullet is determined to be in the same indentation level. A difference between FIGS. 7 and 10 occurs in the manner in which the next bullet is determined to be the same indentation level. In FIG. 7, the next bullet is compared to IP, which represents the first bullet in the indentation level. In FIG. 10, the next bullet is compared to PP, which represents the immediately preceding (vertically adjacent) bullet so that progressive shifting could be addressed more effectively.

As previously discussed, FIG. 8C shows one possible list object 30 obtained from analyzing bulleted list 12 of FIG. 8A according to horizontal position comparison process 70 of FIG. 7. List object 30 of FIG. 8C does not accurately encode the hierarchical structure originally intended by bulleted list author. However, if horizontal position comparison process 70 of FIG. 10 is used with the same threshold T, list object 30 of FIG. 8D becomes possible. List object 30 of FIG. 8D accurately encodes the originally intended hierarchical structure.

As previously discussed, FIG. 9C shows one possible list object 30 obtained from analyzing bulleted list 12 of FIG. 9A according to horizontal position comparison process 70 of FIG. 7. List object 30 of FIG. 9C does not accurately encode the originally intended hierarchical structure. If, instead, horizontal position comparison process 70 of FIG. 10 is used with the same value for threshold T, list object 30 of FIG. 9D becomes possible. Encoding is improved in that bullet 4 is now in the same indentation level as bullet 8. However, encoding is not accurate in that five indentations levels 90 are encoded when only two were originally intended. The excess indentations levels arise because some bullets in an indentation level are separated from each other by bullets in another indentation level. For instance, bullets 1 and 4 originally intended for the same indentation level are separated from each other by bullets 2 and 3 of another indentation level, so bullet 4 was not encoded in the same indentation level as bullet 1. This phenomenon can be corrected by a secondary process.

Figure 11:
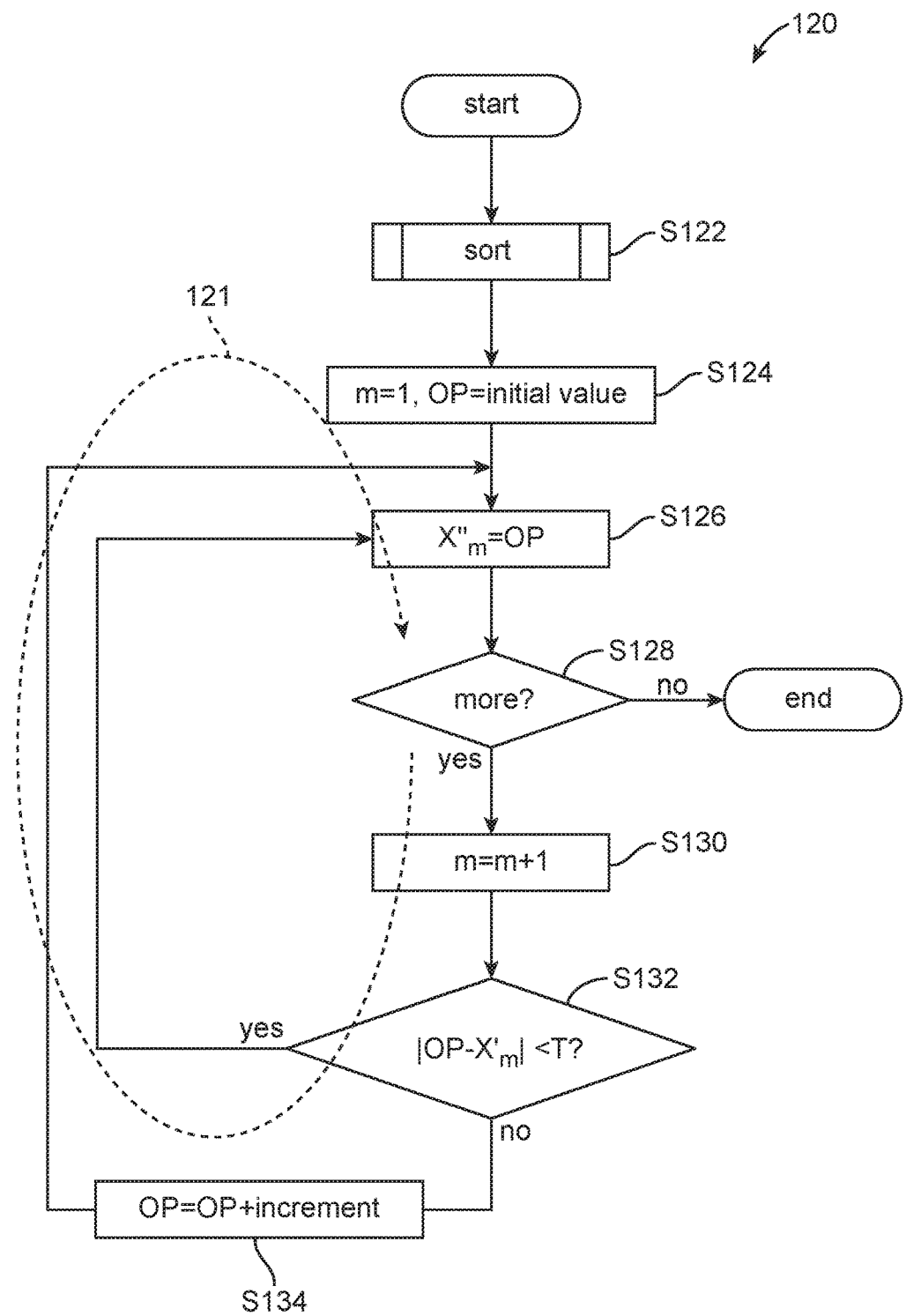
FIG. 11 is a flow diagram showing a secondary process that may be performed in addition to the process of FIGS. 7 and 10.

FIG. 11 shows exemplary secondary process 120 that may optionally be performed after horizontal position comparison process 70 of FIGS. 7 and 10 or other horizontal position comparison process. Either FIG. 7 or 10 may be performed at block S60 of FIG. 3 to identify indentation levels. When there are no more bullets to evaluate in process 70 (S78: NO, or S106: NO), the conversion process within block S60 may optionally proceed to FIG. 11.

Secondary process 120 includes exemplary readjustment cycle 121 that is repeated until a readjusted horizontal position X" is determined for all bullets. Secondary process 120 derives readjusted horizontal positions X" from the adjusted horizontal positions X' of the prior horizontal position comparison process. Secondary process 120 may not always be needed, as illustrated by FIG. 8D which shows list object 30 that accurately encodes the hierarchical structure originally intended by the bulleted list author. Secondary process 120 could be needed for situations in which some bullets in one indentation level are separated from each other by bullets in another indentation level.

At block S122 of FIG. 11, adjusted horizontal positions X' are sequentially sorted to generate a series of sorted bullets m=1 to N. If bulleted list 12 in image 10 has ten bullets, as in FIG. 9A, then N=10. Numbering is not based on the order in which the bullets appear from top to bottom. Numbering is based on the horizontal positions X' of the bullets. In FIG. 9C, m=1 would represent the bullet that is furthest to the left, which happens to be the bullet at the top. M=2 would represent the fourth bullet from the top. M=10 would represent the bullet (bullet item 9) that is furthest to the right.

FIG. 12 shows an exemplary result of sequential sorting at block S122. Sequential sorting refers to sorting based on the values of X'. The letter "n" signifies the order of bullets as they appear top to bottom in image 10 of FIG. 9A. The letter "m" signifies the order in which those bullets will be evaluated in secondary process 120. The sequentially sorted values for X' will be evaluated to determine which bullets are similar enough to be in the same indentation level. Note that in FIG. 9A, bullets n=1 and 4 are separated by bullets 2 and 3 in another indentation level. FIG. 12 shows that after sequential sorting, bullets n=1 and 4 are next to each other, as they are represented by sorted bullets m=1 and 2.

At block S124 of FIG. 11, the sorted horizontal position X' of sorted bullet m=1 is obtained, and the Offset Position (OP) is set equal to an initial value. For example, the initial value can be zero or it can be the adjusted horizontal position X' of the first sorted bullet m=1. OP will be used to encode a horizontal position for the bullet in list object 30.

At block S126, the readjusted horizontal position X" for the current sorted bullet (for example, the first sorted bullet if m=1) is set equal to OP. At block S128, it is determined whether there is an additional sorted bullet. If no (S128: NO), process 120 could end, and conversion optionally proceeds to another process. If yes (S128: YES), the adjusted horizontal position X' of the next sorted bullet is obtained at block S130. Next at block S132, it is determined whether the absolute difference between OP and the adjusted horizontal position X' of the next sorted bullet is less than a threshold T. The previous description for threshold T applies here as well, and the value for T used at block S132 could be the same as or different than the value used at another process block.

At block S132, reaching threshold T or not being less than T (S134: NO) means that the next sorted bullet is not considered to be in the same indentation level, so the Offset Position (OP) is adjusted at block S134. For example, OP is increased by an increment, which can be a fixed value so that all in indentation levels are equally spaced apart in list object 30. Alternatively, the increment can vary. For example, the increment can be equal to the absolute difference taken from block S132 (the absolute difference between OP and the adjusted horizontal position X' of the next sorted bullet). After block S134, the readjusted horizontal position X" of the next sorted bullet is set equal to the adjusted value of OP at block S126. In effect, the next sorted bullet is not aggregated with the prior sorted bullet, and the next bullet (now represented by OP) will be used for comparison with other bullets during subsequent readjustment cycles 121.

If instead the absolute difference between OP and the adjusted horizontal position X' of the next sorted bullet has not reached or is below threshold T (S134: YES), then the next sorted bullet is considered to be in the same indentation level, and its readjusted horizontal position X" is set equal to OP which has not been modified. This operation occurs at block S126, where the readjusted horizontal position X" of the bullet is assigned the value of OP which stores the readjusted horizontal position X" of prior sorted bullets in the indentation level.

The above-described readjustment cycle 121 is repeated if, as determined at block S128, there is another sorted bullet to be evaluated. When repeated, the next sorted bullet discussed above becomes the current sorted bullet in the next readjustment cycle. Other terminology can be used for the current sorted bullet and the next sorted bullet in the above description for readjustment cycle 121. The "current sorted bullet" can be referred to as a "first bullet," and the "next sorted bullet" can be referred to as a "second bullet." Thus, when readjustment cycle 121 is repeated, the second bullet becomes the first bullet in the next readjustment cycle.

Readjustment cycle 121 was performed on a pair of bullets that have adjusted horizontal positions X' that are horizontally adjacent to each other. The pairs of horizontally adjacent bullets were identified from sorting at block S122. The pairs include a first bullet and a second bullet having a horizontal position that is equal to that of the first bullet or is closest to that of the first bullet relative to the other bullets.

Referring to the middle table of FIG. 12, the first readjustment cycle is performed on a first bullet (see first row) having horizontal position X'=0, and a second bullet (see second row) having horizontal position X'=3.5, which is closest to the horizontal position of the first bullet. The second readjustment cycle is performed on a first bullet (see second row) having horizontal position X'=3.5, and a second bullet (see third row) having horizontal position X'=3.5, which is equal to the horizontal position of the first bullet.

Block S132 represents a determination of whether a difference between the horizontal position of the first bullet represented by OP and the horizontal position of the second bullet satisfies a readjustment requirement to identify the first bullet and the second bullet as being alike in indentation level. The readjustment requirement is based on threshold T. In this example, the readjustment requirement is that the absolute value of the difference must be less than threshold T.

Not reaching threshold T or being less than T (S132: YES) corresponds to satisfying the readjustment requirement. In such a case, the horizontal position of the second bullet is adjusted according to the Offset Position (OP). For example, at block S126, the horizontal position of the second bullet is set equal to OP.

Reaching threshold T or not being less than T (S132: NO) corresponds to not satisfying the readjustment requirement. In such a case, the Offset Position (OP) is adjusted. For example, at block S134, an increment is applied to OP. The increment can be constant so that the indentation levels are spaced equally apart, or the increment can vary.

The readjustment requirement used at block S132 uses the condition "less than." A different comparison requirement could be used. For example, the condition "less than" could be replaced with "less than or equal to" and possibly have the same result. The same result could be achieved, for example, by requiring the absolute value of the difference to be less than or equal to a slightly lower value for threshold T. As previously discussed, threshold T can be determined from Equation 1 or other equation which makes use of one or more line heights.

The table at the right side of FIG. 12 shows exemplary readjusted horizontal positions X" derived from the adjusted horizontal positions X'. The readjusted horizontal positions X" are the result of horizontal position comparison process 70 of FIG. 10 followed by secondary process 120 of FIG. 11 with the threshold held constant at T=4 throughout. The initial value for the Offset Position (OP) was set to the adjusted horizontal position X' of the first sorted bullet. Also, the increment for OP was the absolute difference taken from block S132.

Note that the values of X' were sequentially sorted in ascending order, as can be seen in the middle table of FIG. 12. Alternatively, they could be sequentially sorted in descending order, in which case a negative increment could be applied to OP at block S134 to decrease the value of OP.

As previously discussed, FIG. 9D shows one possible list object 30 obtained from analyzing bulleted list 12 of FIG. 9A according to horizontal position comparison process 70 of FIG. 10. List object 30 of FIG. 9D inaccurately encodes five indentation levels 90 when only two indentation levels were originally intended by the bulleted list author. If horizontal position comparison process 70 of FIG. 10 and secondary process 120 of FIG. 11 are used with the same threshold T held constant, list object 30 of FIG. 9E becomes possible. List object 30 of FIG. 9E accurately encodes two indentation levels as originally intended by the bulleted list author.

FIG. 13 illustrates a plurality of exemplary comparison cycles 71 performed according to process 70 of FIG. 10 to obtain adjusted horizontal positions X' for the bulleted list of FIG. 9A.

FIG. 14 illustrates a plurality of exemplary readjustment 121 performed according to process 120 of FIG. 11 to obtain readjusted horizontal positions X" following the comparison cycles 71 performed in FIG. 13. Note that the resulting table on the right side of FIG. 14 matches the table on the right side of FIG. 12.

Figure 15A:
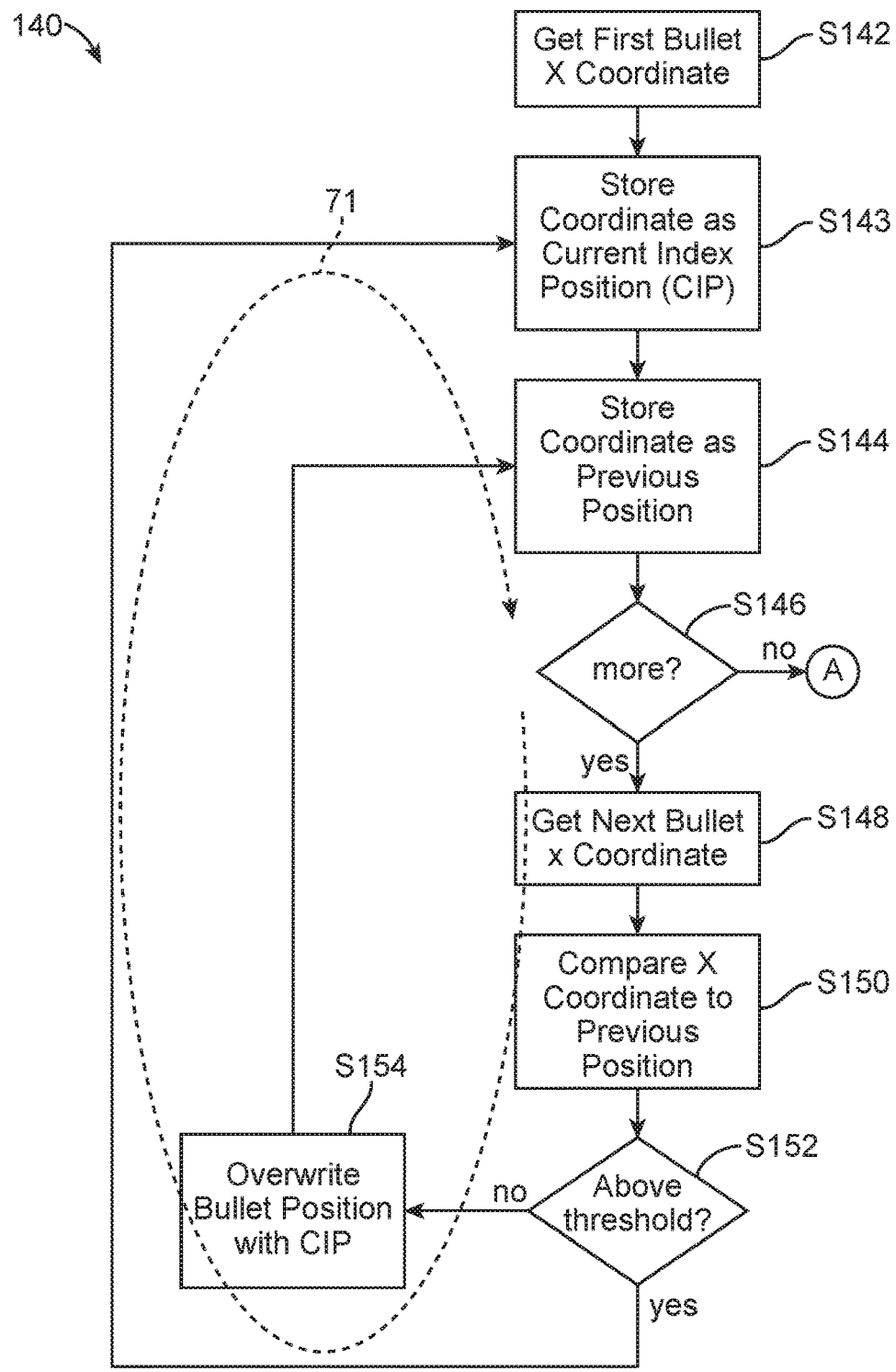
FIGS. 15A and 15B are flow diagrams showing an exemplary indentation determination process that could be implemented by the combination of processes of FIGS. 10 and 11.
Figure 15B:
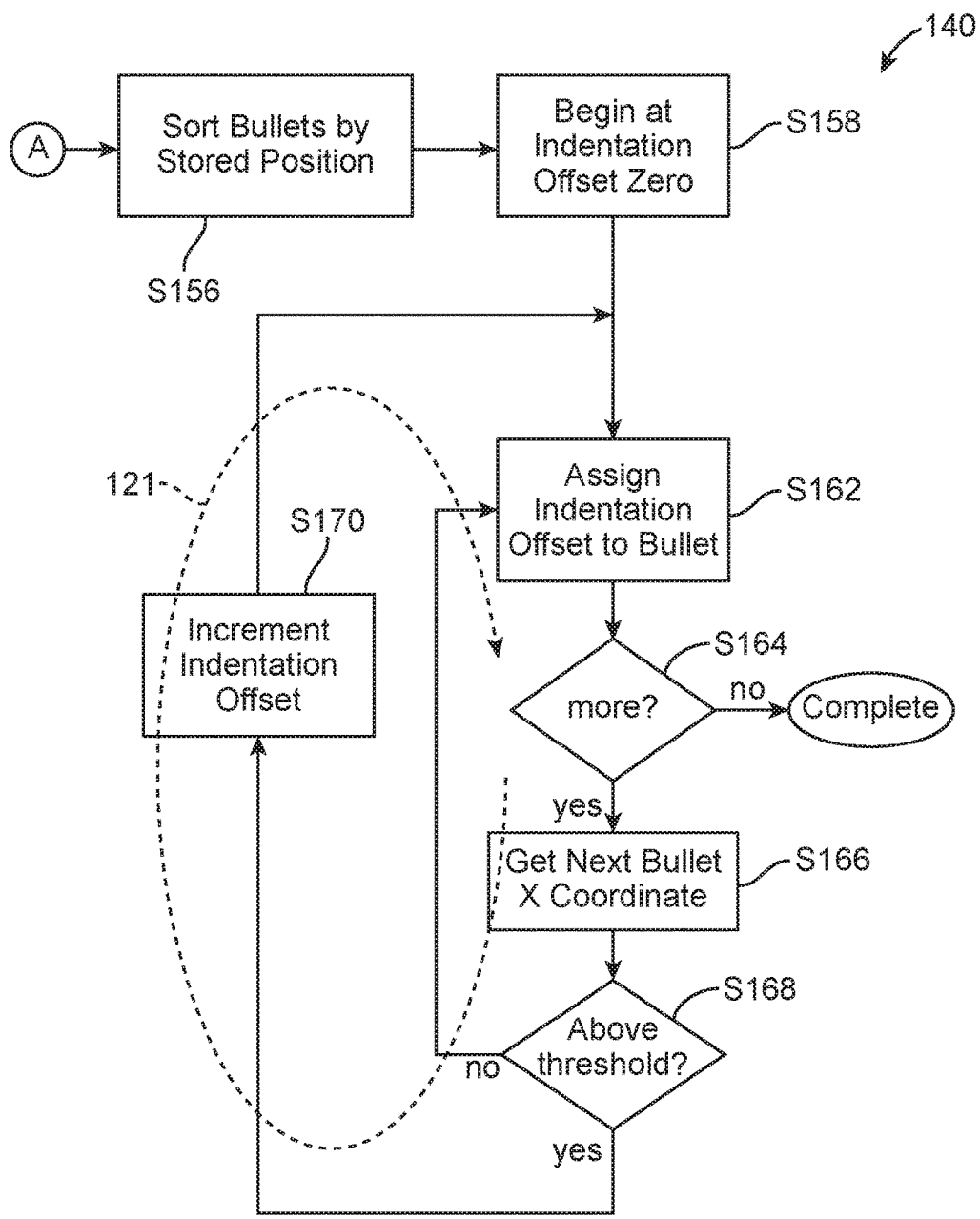

FIGS. 15A and 15B show exemplary indentation determination process 140 that can be implemented by process 70 of FIG. 10 followed by process 120 of FIG. 11. Indentation determination process 140 includes comparison cycle 71 and readjustment cycle 121.

At block S142, the horizontal position (also referred to as the X coordinate) of the first bullet is obtained. The first (top-most) bullet appearing in an input image is usually considered to be the current bullet when process 140 begins. At block S143, the X coordinate of the current bullet is stored as the Index Position (also referred to as the Current Index Position, CIP). At block S144, the coordinate of the current bullet is stored as the Previous Position. At block S146, it is determined whether there is another bullet that remains to be evaluated. If no (S146: NO), process 140 continues to a secondary process shown in FIG. 15B. If yes (S146: YES), the coordinate of the next bullet is obtained at block S148. At block S150, the coordinate of the next bullet is compared to the Previous Position to obtain a difference between them. At block S152, it is determined whether the difference is above a threshold. The previous description for threshold T applies here as well.

Block S152 represents a determination of whether the difference between horizontal positions of the current and next bullets satisfies a comparison requirement to identify those bullets as being alike in indentation level. The comparison requirement is based on threshold T. In this example, the comparison requirement is that the difference must not be greater than the threshold. If the comparison requirement is satisfied (S152: NO), then the next bullet is considered to be in the same indentation level, and its position is adjusted. At block S154, the position of the next bullet is adjusted to be equal to CIP. If the comparison requirement not satisfied (S152: YES), then the next bullet is not considered to be in the same indentation level, and CIP is adjusted. For example, at block S143, CIP is adjusted by setting it equal to the X coordinate of the next bullet. In effect, the X coordinate of the next bullet is stored as CIP for possible use in any subsequent comparison cycle 71.

The above-described comparison cycle 71 is repeated if, as determined at block S146, there is another bullet to be evaluated. When comparison cycle 71 is repeated, the next bullet discussed above becomes the current bullet in the next comparison cycle.

If there is no bullet that remains to be evaluated (S146: NO), indentation determination process 140 proceeds to the secondary process shown in FIG. 15B. At block S156, the bullets are sequentially sorted in the same way as at block S122 of FIG. 11. At block S158, an initial value for the Offset Position (also referred to as indentation offset) is obtained. The initial value can be zero or a non-zero. At block S162, the indentation offset is assigned to the current sorted bullet. At block S164, it is determined whether another bullet remains to be evaluated. If no (S164: NO), process 140 may end, and conversion may optionally proceed to another process. If yes (S164: YES), the coordinate of the next sorted bullet is obtained at block S166. At block S168, it is determined whether a difference between the indentation offset and the next sorted bullet is above a threshold. The previous description for threshold T applies here as well, and the threshold value may be the same or different than what was used at block S152.

Block S168 represents a determination of whether the difference between the current sorted bullet and next sorted bullet satisfies a readjustment requirement to identify those bullets as being alike in indentation level. The readjustment requirement is based on threshold T. In this example, the readjustment requirement is that the difference must not be greater than the threshold.

If the readjustment requirement is satisfied (S168: NO), then the next sorted bullet is considered to be in the same indentation level, and its position is adjusted. Returning to block S162, the position of the next sorted bullet is adjusted to be equal to the indentation offset.

If the readjustment requirement is not satisfied (S168: YES), then the next sorted bullet is not considered to be in the same indentation level, and the indentation offset is adjusted. For example, at block S170, an increment is applied to the indentation offset. Next at block S162, the modified indentation offset is assigned to the next sorted bullet.

The above-described readjustment cycle 121 is repeated if, as determined at block S168, there is another sorted bullet to be evaluated. When repeated, the next sorted bullet discussed above becomes the current sorted bullet in the next readjustment cycle. Other terminology can be used in the above description for readjustment cycle 121. The "current sorted bullet" can be referred to as a "first bullet," and the "next sorted bullet" can be referred to as a "second bullet."

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for determining indentation levels of a bulleted list in an image, the bulleted list having a plurality of bullets that are vertically arranged, each bullet having a horizontal position, the method comprising:
   storing, in memory of a data processing system, the horizontal position of each of the bullets; and
   performing, by a processor of the data processing system, a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle,
   wherein the performance of each of the comparison cycles includes:
      obtaining an index position if the comparison cycle is the first comparison cycle,
      obtaining, from the memory of the data processing system, the horizontal position of the current bullet and the horizontal position of the next bullet, determining whether or not a difference between the obtained horizontal position of the current bullet and the obtained horizontal position of the next bullet satisfies a comparison requirement to identify the current bullet and the next bullet as being alike in indentation level, when the comparison requirement is satisfied, adjusting the horizontal position of the next bullet according to the index position and then storing the adjusted horizontal position of the next bullet in the memory of the data processing system, and adjusting the index position when the comparison requirement is not satisfied, wherein the image containing the bulleted list does not encode aggregation of the bullets into indentation levels, and the method further comprises:

before the performance of the plurality of comparison cycles, deriving the horizontal position of each of the bullets from the image; and after the performance of the plurality of comparison cycles, generating a list object that encodes aggregation of the bullets into indentation levels according to the plurality of comparison cycles.

2. The method of claim 1, wherein adjusting the horizontal position of the next bullet includes setting the horizontal position of the next bullet equal to the index position, and adjusting the index position includes using the obtained horizontal position of the next bullet to modify the index position.

3. The method of claim 2, wherein using the horizontal position of the next bullet to modify the index position includes setting the index position equal to the obtained horizontal position of the next bullet.

4. The method of claim 1, wherein each bullet leads a plurality of objects enclosed in a rectangular perimeter having a line height, and the comparison requirement is based on one or more of the line heights.

5. The method of claim 1, wherein the plurality of comparison cycles includes a third comparison cycle following the second comparison cycle, and the next bullet of the second comparison cycle becomes the current bullet of the third comparison cycle.

6. The method of claim 1, further comprising, after the performance of the plurality of comparison cycles:

sorting the horizontal positions of the bullets to identify pairs of horizontally adjacent bullets, wherein each pair of horizontally adjacent bullets includes a first bullet and a second bullet having a horizontal position that is equal to that of the first bullet or is closest to that of the first bullet relative to the other bullets in the plurality of bullets; and performing a plurality of readjustment cycles, wherein each readjustment cycle is performed on one of the pairs of horizontally adjacent bullets, the plurality of readjustment cycles includes a first readjustment cycle and a second readjustment cycle following the first readjustment cycle, the second bullet of the first readjustment cycle becomes the first bullet of the second comparison cycle, wherein the performance of each of the readjustment cycles includes:

obtaining an offset position if the readjustment cycle is the first readjustment cycle, determining whether or not a difference between the horizontal position of the first bullet and the horizontal position of the second bullet satisfies a readjustment requirement to identify the first bullet and the second bullet as being alike in indentation level, adjusting the horizontal position of the second bullet according to the offset position when the readjustment requirement is satisfied, and adjusting the offset position when the readjustment requirement is not satisfied.

7. The method of claim 6, wherein adjusting the horizontal position of the second bullet includes setting the horizontal position of the second bullet equal to the offset position, and adjusting the offset position includes applying an increment to the offset position.

8. The method of claim 6, wherein each bullet leads a plurality of objects enclosed in a rectangular perimeter having a line height, and the readjustment requirement is based on one or more of the line heights.

9. The method of claim 6, wherein the plurality of readjustment cycles includes a third readjustment cycle following the second readjustment cycle, and the second bullet of the second readjustment cycle becomes the first bullet of the third readjustment cycle.

10. A non-transitory computer readable medium having stored thereon computer readable instructions that, when executed by a hardware processor, cause a data processing system to perform a method for determining indentation levels of a bulleted list in an image, the bulleted list having a plurality of bullets that are vertically arranged, each bullet having a horizontal position, the method performed by the data processing system comprising:

performing a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle, wherein the performance of each of the comparison cycles includes:

obtaining an index position if the comparison cycle is the first comparison cycle, determining whether or not a difference between the horizontal position of the current bullet and the horizontal position of the next bullet satisfies a comparison requirement to identify the current bullet and the next bullet as being alike in indentation level, adjusting the horizontal position of the next bullet according to the index position when the comparison requirement is satisfied, and adjusting the index position when the comparison requirement is not satisfied, wherein the image containing the bulleted list does not encode aggregation of the bullets into indentation levels, and the method performed by the data processing system further comprises:

before the performance of the plurality of comparison cycles, deriving the horizontal position of each of the bullets from the image; and after the performance of the plurality of comparison cycles, generating a list object that encodes aggregation of the bullets into indentation levels according to the plurality of comparison cycles.

11. The non-transitory computer readable medium of claim 10, wherein adjusting the horizontal position of the next bullet includes setting the horizontal position of the next bullet equal to the index position, and adjusting the index position includes using the horizontal position of the next bullet to modify the index position.

12. The non-transitory computer readable medium of claim 11, wherein using the horizontal position of the next bullet to modify the index position includes setting the index position equal to the horizontal position of the next bullet.

13. The non-transitory computer readable medium of claim 10, wherein each bullet leads a plurality of objects enclosed in a rectangular perimeter having a line height, and the comparison requirement is based on one or more of the line heights.

14. The non-transitory computer readable medium of claim 10, wherein the plurality of comparison cycles includes a third comparison cycle following the second comparison cycle, and the next bullet of the second comparison cycle becomes the current bullet of the third comparison cycle.

15. The non-transitory computer readable medium of claim 10, wherein the method performed by the data processing system further comprises, after the performance of the plurality of comparison cycles:
   sorting the horizontal positions of the bullets to identify pairs of horizontally adjacent bullets, wherein each pair of horizontally adjacent bullets includes a first bullet and a second bullet having a horizontal position that is equal to that of the first bullet or is closest to that of the first bullet relative to the other bullets in the plurality of bullets; and
   performing a plurality of readjustment cycles, wherein each readjustment cycle is performed on one of the pairs of horizontally adjacent bullets, the plurality of readjustment cycles includes a first readjustment cycle and a second readjustment cycle following the first readjustment cycle, the second bullet of the first readjustment cycle becomes the first bullet of the second comparison cycle,
   wherein the performance of each of the readjustment cycles includes:
      obtaining an offset position if the readjustment cycle is the first readjustment cycle,
      determining whether or not a difference between the horizontal position of the first bullet and the horizontal position of the second bullet satisfies a readjustment requirement to identify the first bullet and the second bullet as being alike in indentation level,
      adjusting the horizontal position of the second bullet according to the offset position when the readjustment requirement is satisfied, and
      adjusting the offset position when the readjustment requirement is not satisfied.

16. The non-transitory computer readable medium of claim 15, wherein adjusting the horizontal position of the second bullet includes setting the horizontal position of the second bullet equal to the offset position, and adjusting the offset position includes applying an increment to the offset position.

17. The non-transitory computer readable medium of claim 15, wherein each bullet leads a plurality of objects enclosed in a rectangular perimeter having a line height, and the readjustment requirement is based on one or more of the line heights.

18. The non-transitory computer readable medium of claim 15, wherein the plurality of readjustment cycles includes a third readjustment cycle following the second readjustment cycle, and the second bullet of the second readjustment cycle becomes the first bullet of the third readjustment cycle.

19. A data processing system for determining indentation levels of a bulleted list in an image, the bulleted list having a plurality of bullets that are vertically arranged, each bullet having a horizontal position, the system comprising:
   a hardware processor; and
   one or more memory devices associated with the hardware processor;
   wherein the hardware processor is configured to determine indentation levels by performing a method that comprises:
   performing a plurality of comparison cycles, wherein each comparison cycle is performed on a pair of vertically adjacent bullets, each pair includes a current bullet and a next bullet that is vertically adjacent to the current bullet, the plurality of comparison cycles includes a first comparison cycle and a second comparison cycle following the first comparison cycle, the next bullet of the first comparison cycle becomes the current bullet of the second comparison cycle,
   wherein the performance of each of the comparison cycles includes:
      obtaining an index position if the comparison cycle is the first comparison cycle,
      determining whether or not a difference between the horizontal position of the current bullet and the horizontal position of the next bullet satisfies a comparison requirement to identify the current bullet and the next bullet as being alike in indentation level,
      adjusting the horizontal position of the next bullet according to the index position when the comparison requirement is satisfied, and
      adjusting the index position when the comparison requirement is not satisfied,
   wherein the image containing the bulleted list does not encode aggregation of the bullets into indentation levels, and the method performed by the hardware processor further comprises:
   before the performance of the plurality of comparison cycles, deriving the horizontal position of each of the bullets from the image; and
   after the performance of the plurality of comparison cycles, generating a list object that encodes aggregation of the bullets into indentation levels according to the plurality of comparison cycles.

20. The system of claim 19, wherein adjusting the horizontal position of the next bullet includes setting the horizontal position of the next bullet equal to the index position, and adjusting the index position includes using the horizontal position of the next bullet to modify the index position.

21. The system of claim 20, wherein using the horizontal position of the next bullet to modify the index position includes setting the index position equal to the horizontal position of the next bullet.

22. The system of claim 19, wherein each bullet leads a plurality of objects enclosed in a rectangular perimeter having a line height, and the comparison requirement is based on one or more of the line heights.

23. The system of claim 19, wherein the plurality of comparison cycles includes a third comparison cycle following the second comparison cycle, and the next bullet of the second comparison cycle becomes the current bullet of the third comparison cycle.

24. The system of claim 19, wherein the method performed by the hardware processor further comprises, after the performance of the plurality of comparison cycles:
   sorting the horizontal positions of the bullets to identify pairs of horizontally adjacent bullets, wherein each pair of horizontally adjacent bullets includes a first bullet and a second bullet having a horizontal position that is equal to that of the first bullet or is closest to that of the first bullet relative to the other bullets in the plurality of bullets; and performing a plurality of readjustment cycles, wherein each readjustment cycle is performed on one of the pairs of horizontally adjacent bullets, the plurality of readjustment cycles includes a first readjustment cycle and a second readjustment cycle following the first readjustment cycle, the second bullet of the first readjustment cycle becomes the first bullet of the second comparison cycle, wherein the performance of each of the readjustment cycles includes:

obtaining an offset position if the readjustment cycle is the first readjustment cycle, determining whether or not a difference between the horizontal position of the first bullet and the horizontal position of the second bullet satisfies a readjustment requirement to identify the first bullet and the second bullet as being alike in indentation level, adjusting the horizontal position of the second bullet according to the offset position when the readjustment requirement is satisfied, and adjusting the offset position when the readjustment requirement is not satisfied.

25. The system of claim 24, wherein adjusting the horizontal position of the second bullet includes setting the horizontal position of the second bullet equal to the offset position, and adjusting the offset position includes applying an increment to the offset position.

26. The system of claim 24, wherein each bullet leads a plurality of objects enclosed in a rectangular perimeter having a line height, and the readjustment requirement is based on one or more of the line heights.

27. The system of claim 24, wherein the plurality of readjustment cycles includes a third readjustment cycle following the second readjustment cycle, and the second bullet of the second readjustment cycle becomes the first bullet of the third readjustment cycle.

* * * * *